(12) United States Patent
Ayyar et al.

(10) Patent No.: US 7,738,484 B2
(45) Date of Patent: Jun. 15, 2010

(54) METHOD, SYSTEM, AND APPARATUS FOR SYSTEM LEVEL INITIALIZATION

(75) Inventors: Mani Ayyar, Cupertino, CA (US);
Srinivas Chennupaty, Portland, OR (US); Akhilesh Kumar, Sunnyvale, CA (US); Doddaballapur N. Jayasimha, Sunnyvale, CA (US); Murugasamy Nachimuthu, Hillsboro, OR (US); Phanindra K. Mannava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1203 days.

(21) Appl. No.: 11/011,801

(22) Filed: Dec. 13, 2004

(65) Prior Publication Data
US 2006/0126656 A1 Jun. 15, 2006

(51) Int. Cl.
*H04L 12/42* (2006.01)
(52) U.S. Cl. .................................. 370/453; 706/45
(58) Field of Classification Search ................. 370/535; 706/45; 710/3, 100; 716/2
See application file for complete search history.

(56) References Cited

U.S. PATENT DOCUMENTS

| | | | | |
|---|---|---|---|---|
| 4,646,075 A | * | 2/1987 | Andrews et al. | 345/440 |
| 5,315,533 A | * | 5/1994 | Stich et al. | 700/298 |
| 5,598,348 A | * | 1/1997 | Rusu et al. | 716/2 |
| 5,815,299 A | * | 9/1998 | Bayart et al. | 398/94 |
| 6,189,106 B1 | * | 2/2001 | Anderson | 713/300 |
| 6,275,905 B1 | * | 8/2001 | Keller et al. | 711/141 |
| 6,292,215 B1 | * | 9/2001 | Vincent | 348/169 |
| 6,321,276 B1 | * | 11/2001 | Forin | 710/3 |
| 6,330,586 B1 | | 12/2001 | Yates et al. | |
| 6,557,069 B1 | * | 4/2003 | Drehmel et al. | 710/307 |
| 6,650,155 B1 | | 11/2003 | Nguyen et al. | |
| 6,725,317 B1 | | 4/2004 | Bouchier et al. | |

(Continued)

FOREIGN PATENT DOCUMENTS

CN 1107266 8/1997

(Continued)

OTHER PUBLICATIONS

Office Action for Chinese Patent Application No. 200510107388.6 mailed Nov. 23, 2007, 16 pgs.

(Continued)

*Primary Examiner*—Thong H Vu
(74) *Attorney, Agent, or Firm*—Blakely, Sokoloff, Taylor & Zafman LLP

(57) ABSTRACT

Multiple initialization techniques for system and component in a point-to-point architecture are discussed. Consequently, the techniques allow for flexible system/socket layer parameters to be tailored to the needs of the platform, such as, desktop, mobile, small server, large server, etc., as well as the component types such as IA32/IPF processors, memory controllers, IO Hubs, etc. Furthermore, the techniques facilitate powering up with the correct set of POC values, hence, it avoids multiple warm resets and improves boot time. In one embodiment, registers to hold new values, such as, Configuration Values Driven during Reset (CVDR), and Configuration Values Captured during Reset (CVCR) may be eliminated.

For example, the POC values could be from the following: Platform Input Clock to Core Clock Ratio, Enable/disable LT, Configurable Restart, Burn In Initialization Mode, Disable Hyper Threading, System BSP Socket Indication, and Platform Topology Index.

8 Claims, 6 Drawing Sheets

U.S. PATENT DOCUMENTS

| | | | |
|---|---|---|---|
| 6,985,502 B2 * | 1/2006 | Bunton | 370/535 |
| 7,051,218 B1 * | 5/2006 | Gulick et al. | 713/310 |
| 7,065,688 B1 * | 6/2006 | Moyes et al. | 714/718 |
| 7,146,510 B1 * | 12/2006 | Helms et al. | 713/300 |
| 7,174,467 B1 * | 2/2007 | Helms et al. | 713/300 |
| 7,509,403 B1 * | 3/2009 | Lee et al. | 709/223 |
| 2001/0053694 A1 | 12/2001 | Igarashi et al. | |
| 2002/0059501 A1 * | 5/2002 | McKinney et al. | 711/144 |
| 2002/0138225 A1 * | 9/2002 | Wong et al. | 702/119 |
| 2004/0193706 A1 * | 9/2004 | Willoughby et al. | 709/223 |
| 2004/0236798 A1 * | 11/2004 | Srinivasan et al. | 707/200 |
| 2005/0259696 A1 * | 11/2005 | Steinman et al. | 370/535 |
| 2006/0041696 A1 * | 2/2006 | Cherukuri et al. | 710/100 |
| 2006/0184480 A1 * | 8/2006 | Ayyar et al. | 706/45 |

FOREIGN PATENT DOCUMENTS

| | | |
|---|---|---|
| JP | 7182225 | 7/1995 |
| WO | WO-03054713 | 7/2003 |

OTHER PUBLICATIONS

Office Action for U.S. Appl. No. 11/011,300, mailed Oct. 7, 2008, 11 pgs.

Office Action for Chinese Patent Application No. 200510119157.7 mailed Dec. 14, 2007, 49 pgs.

Office Action for Chinese Patent Application No. 200510119157.7 mailed May 30, 2008, 11 pgs.

Office Action for Chinese Patent Application No. 200510119157.7 mailed Jul. 13, 2007, 6 pgs.

Final Office Action from U.S. Appl. No. 11/011,300, mailed Jan. 23, 2009, 11 pgs.

Office Action from U.S. Appl. No. 11/011,300, mailed Jun. 18, 2009, 13 pgs.

Office Action for Chinese Patent Application No. 200510107388.6 mailed Jun. 19, 2009, 7 pgs.

First Office Action for Chinese Patent Application No. 200810090191.9 mailed Sep. 18, 2009, 6 pqs.

* cited by examiner

| System Profile Type Value | Usage |
|---|---|
| 0 | No information |
| 1 | POC values for IA32 cores in UP configuration |
| 2 | POC values for IA32 cores in DP configuration |
| 3 | POC values for IA32 cores in Small MP configuration |
| 4 | POC values for IA32 cores in Large MP configuration |
| 8 | POC values for IA32 cores in Mobile configuration |
| 12 | POC values for Itanium (IPF) cores in UP configuration |
| 13 | POC values for Itanium (IPF) cores in UP configuration |
| 14 | POC values for Itanium (IPF) cores in UP configuration |
| 15 | POC values for Itanium (IPF) cores in UP configuration |
| 16 | POC values for Memory Agents |
| 20 | POC values for IO Agents |

Figure 4

METHOD, SYSTEM, AND APPARATUS FOR SYSTEM LEVEL INITIALIZATION

RELATED APPLICATIONS

The present U.S. Patent application is related to the following U.S. Patent applications:

(1) application Ser. No. 11/011,300, with a different set of inventors, filed Dec. 13, 2004, entitled Method, System, and Apparatus for Dynamic Reconfiguration of Resources

BACKGROUND OF THE INVENTION

1. Field of the Invention

The present invention relates to systems that support efficient utilization of conveying initialization values for link based systems.

2. Description of the Related Art

Current systems based on the Front Side Bus (FSB) do not permit hot plug of an individual bus component. Likewise, the current systems suffer from pin limitation due to conveying initialization values and also suffer from performing multiple warm resets due to initial POC values being incorrect.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

FIG. 4 illustrates a block diagram for POC values as utilized by an embodiment.

DETAILED DESCRIPTION OF THE INVENTION

A method, apparatus, and system for system level initialization for a high speed point to point network (pTp) is described in the following description, for purposes of explanation, numerous details are set forth in order to provide a thorough understanding of the present invention. However, it will be apparent to one skilled in the art that these specific details are not required in order to practice the present invention.

An area of current technological development relates to reliability, availability, and serviceability (RAS). As previously described, current systems are based on the Front Side Bus (FSB) do not permit hot plug of an individual bus component. Likewise, the current systems suffer from pin limitation due to conveying initialization values and also suffer from performing multiple warm resets due to initial POC values are incorrect.

In contrast, the claimed subject matter overcomes the pin limitation by conveying initialization values using the link layer control flits and simplifies the hardware. Likewise, it allows for flexible system/socket layer parameters to be tailored to the needs of the platform, such as, desktop, mobile, small server, large server, etc., as well as the component types such as IA32/IPF processors, memory controllers, IO Hubs, etc. The claimed subject matter also facilitates powering up with the correct set of POC values; hence, it avoids multiple warm resets and improves boot time. In one embodiment, registers to hold new values, such as, Configuration Values Driven during Reset (CVDR), and Configuration Values Captured during Reset (CVCR) may be eliminated.

In one embodiment, the POC values comprise the following: Platform Input Clock to Core Clock Ratio, Enable/disable LT, Configurable Restart, Burn In Initialization Mode, Disable Hyper Threading, System BSP Socket Indication, and Platform Topology Index.

In one embodiment, the pTp architecture is defined by Intel's Common System Interface (CSI) and supports a layered protocol scheme, which is discussed in further detail in the next paragraph. Figure one illustrates one example of a cache coherence protocol's abstract view of the underlying network. One example of a cache coherence protocol is described in pending application P18890 filed in 2004.

Figure 1:
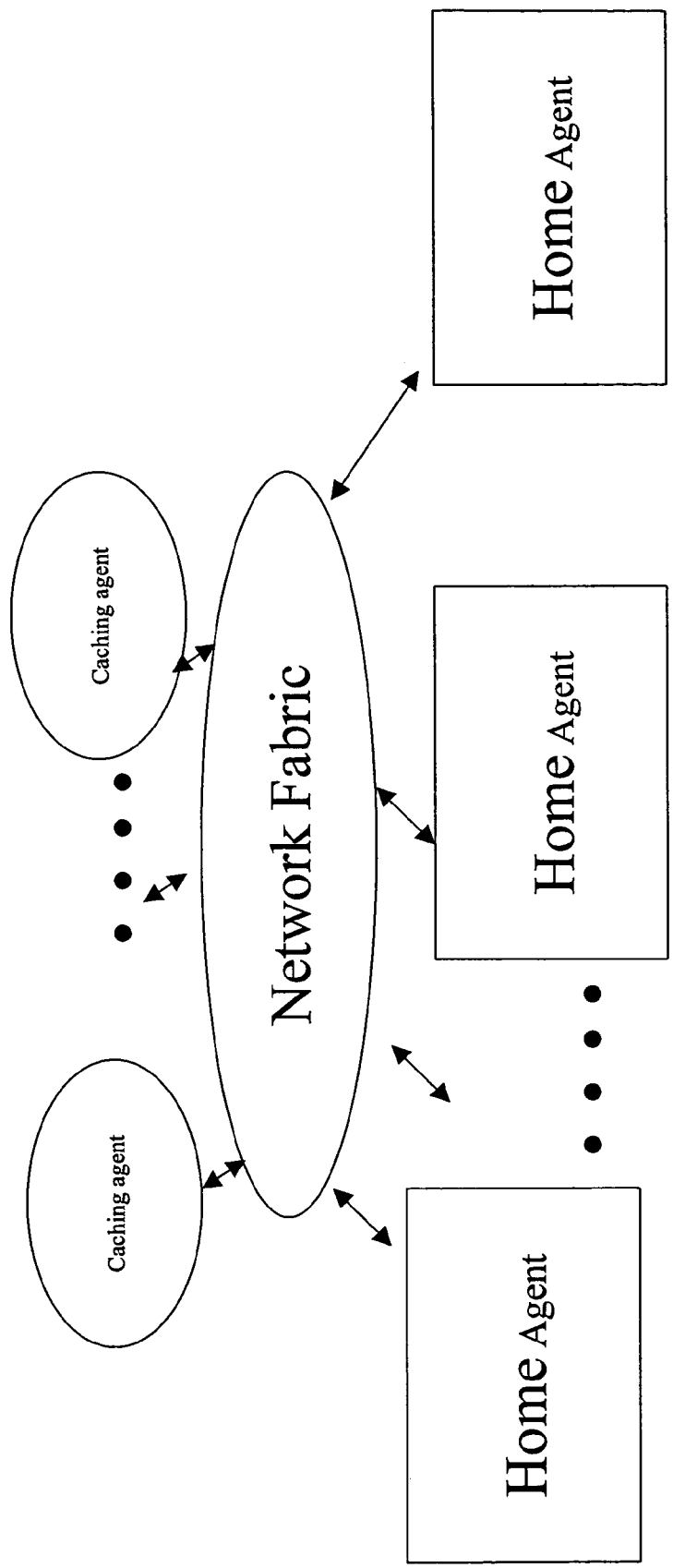
FIG. 1 is a protocol architecture as utilized by one embodiment.

FIG. 1 is a protocol architecture as utilized by one embodiment. The architecture depicts a plurality of caching agents and home agents coupled to a network fabric. For example, the network fabric adheres to a layered protocol scheme and may comprise either or all of: a link layer, a physical layer, a protocol layer, a routing layer, a transport layer. The fabric facilitates transporting messages from one protocol (home or caching agent) to another protocol for a point to point network. In one aspect, the figure depicts a cache coherence protocol's abstract view of the underlying network.

Figure 2:
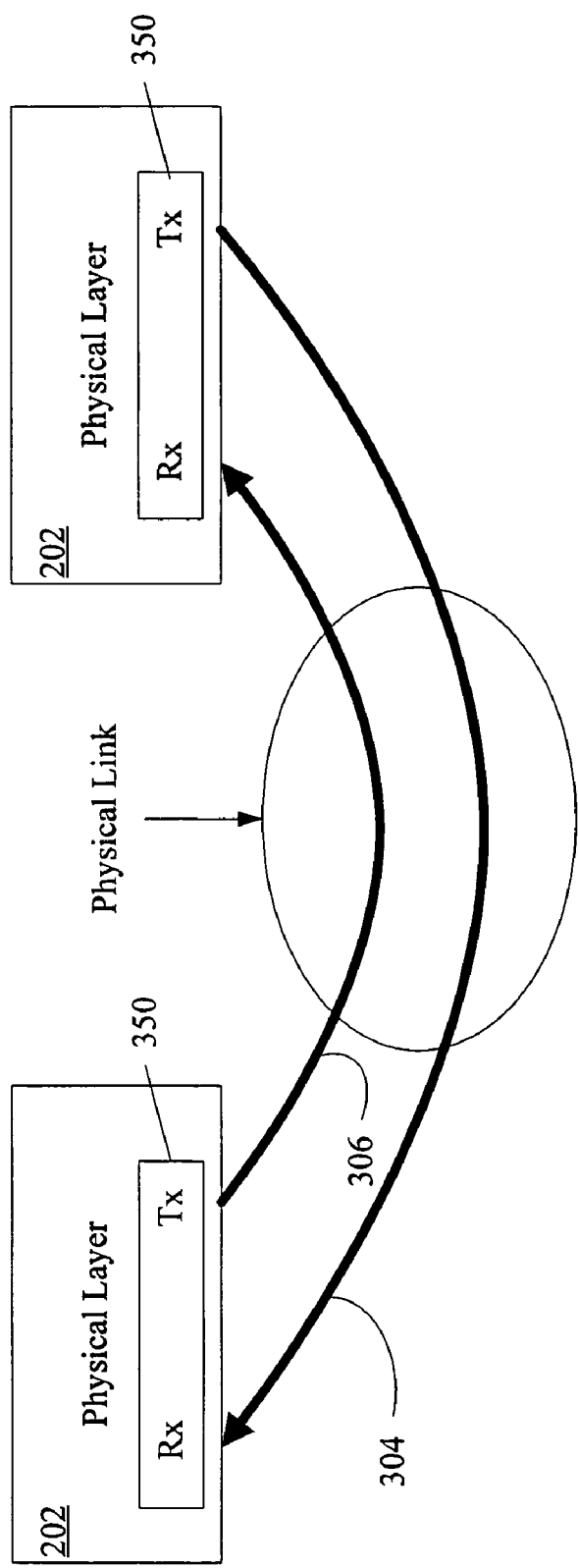
FIG. 2 is a block diagram of an apparatus for a physical interconnect utilized in accordance with the claimed subject matter.

FIG. 2 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second unidirectional link 306 from a first transmit port 350 of the second integrated device to a first receiver port 350 of the first integrated device. However, the claimed subject matter is not limited to two unidirectional links. One skilled in the art appreciates the claimed subject matter supports any known signaling techniques, such as, bi-directional links, etc.

Figure 3:
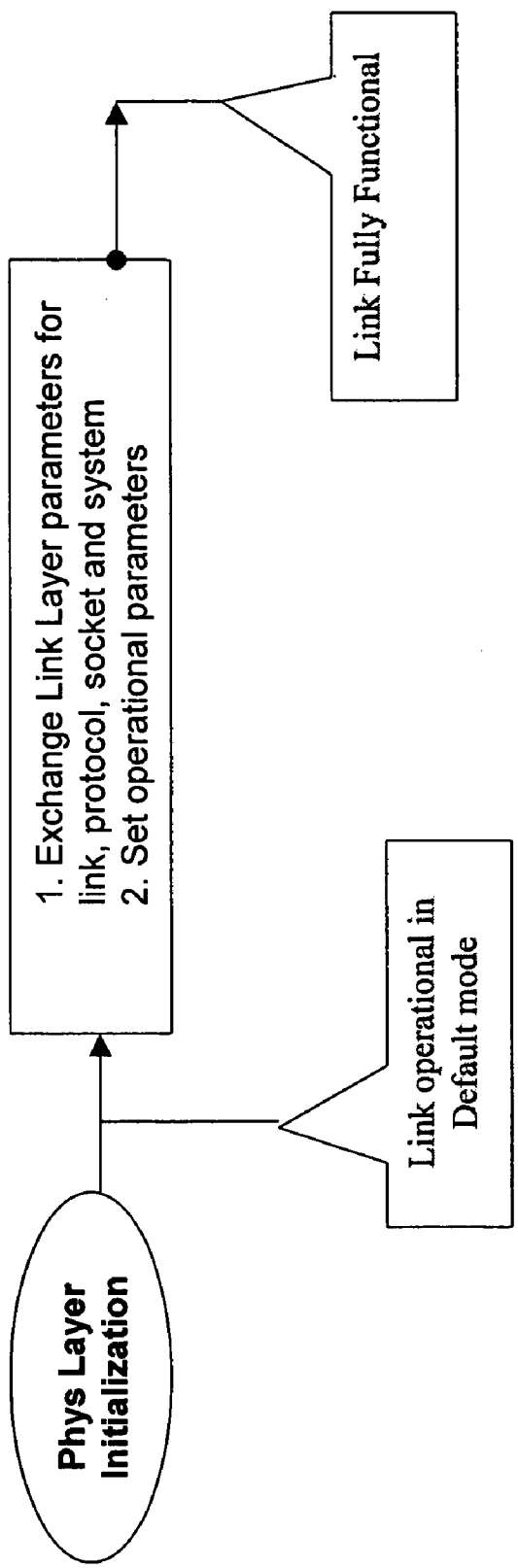
FIG. 3 illustrates a flow diagram for a method for Link layer initialization as utilized by an embodiment.

FIG. 3 illustrates a flow diagram for a method for Link layer initialization as utilized by an embodiment. To start the physical layer initialization, a signal is asserted, such as, a PWRGOOD signal. Subsequently, this permits electrical transfer of information between two neighbor components. Subsequently, the CSI link layer initialization is performed conveying the capabilities and identifiers of the components at either end of the link. Link layer initialization is achieved by the components exchanging link layer control messages (alternatively called control flits). The information conveyed using control flits includes parameters for the link layer, protocol layer as well as initialization values for the CSI component(s) on the socket and the system. Thus, the parameters pertaining to the link layer include values for flit framing, error detection and recovery policy, interleaving policy, virtual channel, flow control capability, etc. Parameters pertaining to the protocol layer include neighbor's Node identifiers, Agent type(s), Remote port#, profile dependent fields, etc. Parameters pertaining to socket/system layer include POC values, test and debug parameters, system configuration and initialization parameters, etc. In one embodiment, some of the exchanged parameters may be usable by more than one logic layer. Some of the parameters may be used by firmware in later stages of system initialization.

As previously discussed, control flits facilitate component and system initialization. Control flits associated with link initialization are followed by one or more control flits that are used for initialization of the CSI component(s) or the system. This exchange need not occur on all the links. The expected flow is from IO agent to CPU but CPU to IO agent flow is also possible, e.g., South Bridge Presence Indicator on CPU socket for use by the IO agent. This invention discusses initialization of the CSI socket/system parameters that are useful for:

processor firmware (Processor Abstraction Layer (PAL) or microcode) and system firmware (System Abstraction Layer (SAL) or Basic Input Output System (BIOS)).

The following examples of exchanged parameters comprise:

i) SBSP indicator, Built in self test (BIST), Processor to Platform Clock Ratio, Authentication of external Firmware, Burn in Testing, parameters that aid in system test and debug, etc., conveyed typically on FSB based systems using pin hardware.

ii) Indication of the cores that should remain inactive for avoiding defective cores or implementing licensing restrictions, Capacity on Demand feature, etc.

iii) Platform Topology index, that may be used by the firmware to obtain values for programming the Route tables and other interconnect fabric using data from the firmware, non-volatile memory (NVM) or other platform resource.

iv) Indication to a Memory controller to preserve the memory contents.

v) Indication to an IO agent that the processor socket incorporates bridges, hubs and devices which are logically downstream from the IO agent.

FIG. 4 illustrates a block diagram for POC values as utilized by an embodiment. FIG. 4 depicts one example of defining POC values based on a value of a system profile type value.

In prior art systems, components start with one set of values due to the paucity of pins, firmware reads appropriate values from a platform resource, re-programs with desired values and then performs a warm reset to activate the new set of values.

In contrast, as previously discussed, the claimed subject matter facilitates utilizing the correct POC values to minimize warm resets. In one embodiment, the POC values are be derived in an implementation dependent manner. One possible mechanism is for the IO agent to derive values from straps and then pass them to processors. It may also be possible for the IO agent to obtain values from its local NVM or Firmware space, or obtain values from downstream chipsets using a separate protocol that occurs prior to the CSI link initialization.

In one embodiment, the POC values comprise the following: Platform Input Clock to Core Clock Ratio, Enable/disable LT, Configurable Restart, Burn In Initialization Mode, Disable Hyper Threading, System BSP Socket Indication, and Platform Topology Index.

Figure 5:
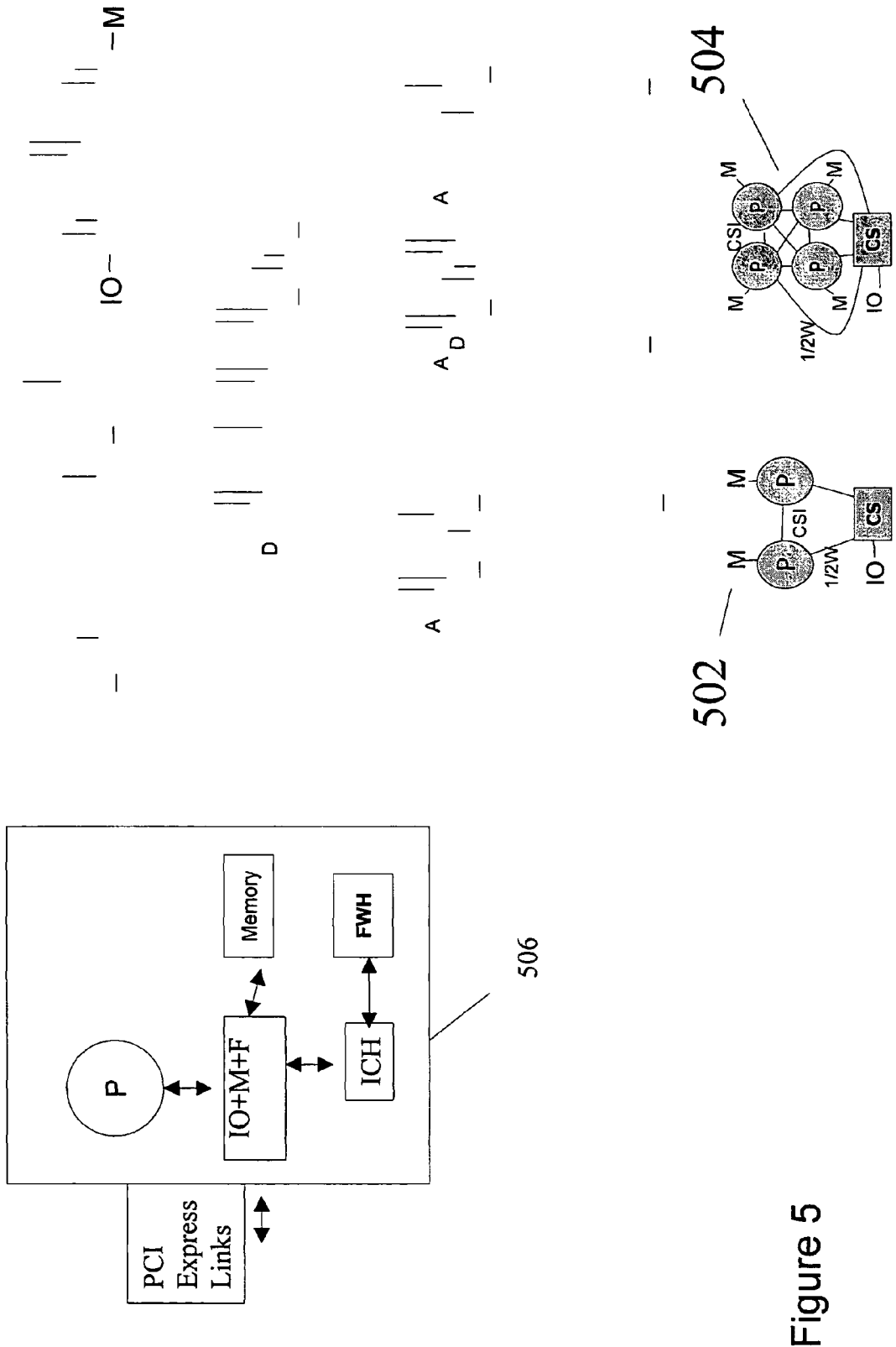
FIG. 5 is multiple embodiments of a system as utilized by multiple embodiments.

FIG. 5 depicts a point-to-point system with one or more processors. The claimed subject matter comprises several embodiments, one with one processor 506, one with two processors (P) 502 and one with four processors (P) 504. In embodiments 502 and 504, each processor is coupled to a memory (M) and is connected to each processor via a network fabric may comprise either or all of: a link layer, a protocol layer, a routing layer, a transport layer, and a physical layer. The fabric facilitates transporting messages from one protocol (home or caching agent) to another protocol for a point-to-point network. As previously described, the system of a network fabric supports any of the embodiments depicted in connection with FIGS. 1-4.

For embodiment 506, the uni-processor P is coupled to graphics and memory control, depicted as IO+M+F, via a network fabric link that corresponds to a layered protocol scheme. The graphics and memory control is coupled to memory and is capable of receiving and transmitting via PCI Express Links. Likewise, the graphics and memory control is coupled to the ICH. Furthermore, the ICH is coupled to a firmware hub (FWH) via a LPC bus. Also, for a different uni-processor embodiment, the processor would have external network fabric links. The processor may have multiple cores with split or shared caches with each core coupled to a Xbar router and a non-routing global links interface. Thus, the external network fabric links are coupled to the Xbar router and a non-routing global links interface.

Figure 6:
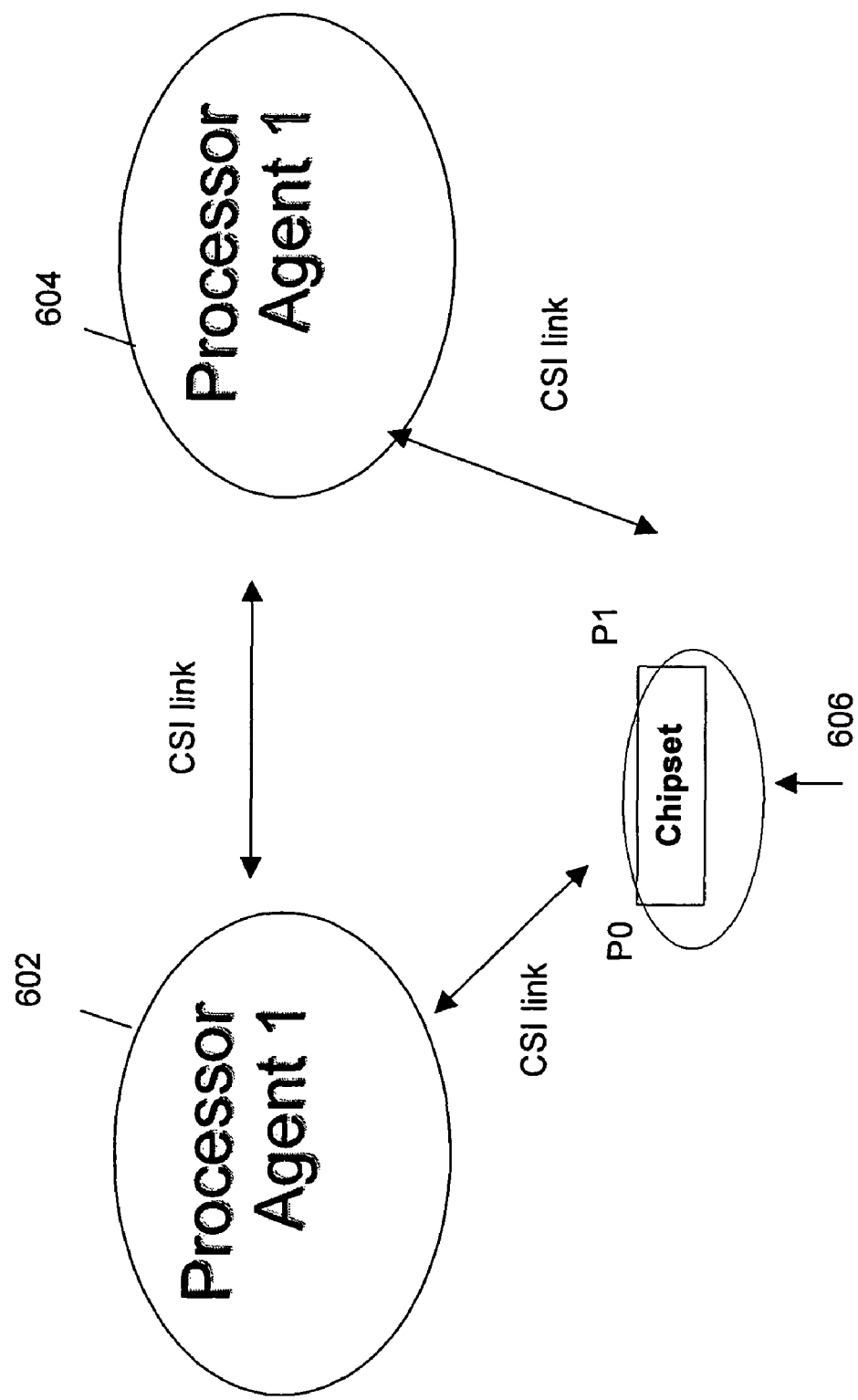
FIG. 6 illustrates a block diagram for node id assignment as utilized by an embodiment.

FIG. 6 illustrates a block diagram for node id assignment as utilized by an embodiment. In one embodiment, unique NodeIDs are needed for communication between CSI agents in a system. There are several embodiments that are used for derivation of unique NodeIDs in a CSI based system, such as:

i) A uni-processor system configuration may use default NodeID values for the chipset and the processor component.

ii) The platform may provide hardware straps for NodeID values that are read by the CSI component hardware and then used to initialize internal registers representing the NodeID. If a CSI component has multiple agents such as Processor, Memory, Configuration agent, it may suffix some bits to the hardware strap values and instantiate required unique NodeID values.

iii) A Service processor may set the components' registers with unique NodeID values using server management channels such as JTAG or SMBUS.

iv) A chipset may assign NodeIDs to processor agents using the link layer parameter exchange protocol, as shown in FIG. 6. All the links complete their physical layer initialization and send the ReadyForInit link layer control flit to their neighbors. The CSI processor agents, 602 and 604, then keep sending Null Control flits to each other and to the chipset 606 over their respective CSI link. The chipset, which is responsible for NodeID assignment to the processor agents, sends the Parameter Exchange Parameter 0 control flit that specifies the chipset's NodeID and the link port number on the chipset through which it is connected to the processor agent. The processors use the supplied port number as their own NodeID. For example, if the chipset has two ports numbered 0 and 1, one of the processor agents will derive a NodeID of 0 and the other a NodeID of 1. The chipset may also default to a NodeID value outside this range, e.g., 8. Once processors derive their NodeIDs, they can proceed further in the link initialization. They can respond to the chipset with their derived NodeIDs and also continue initialization of the processor-to-processor links. The system configuration shown in FIG. 2 can be implemented without any for hardware straps for specifying NodeID values.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. An apparatus to Power on Clear (POC) value in a point-to-point (pTp) architecture comprising:
   an I/O agent to derive the POC value from a plurality of straps;
   the I/O agent to forward the POC value to a plurality of processors that adhere to the pTp architecture over a plurality of point to point links; and
   a plurality of processing cores coupled with the I/O agent via the plurality of point to point links, wherein the plurality of point to point links each comprise a pair of uni-directional links between pairs of processing cores, the plurality of processing cores to receive the POC value and to set operational parameters based on the POC value.

2. The apparatus of claim 1, wherein the POC value is any one or more of the following:
   Platform Input Clock to Core Clock Ratio, Enable/disable LT, Configurable Restart, Burn In Initialization Mode, Disable Hyper Threading, System BSP Socket Indication, and Platform Topology Index.

3. A method for establishing Power on Clear (POC) value in a point-to-point (pTp) architecture comprising:
   deriving, with an input/output (I/O) agent the POC value from a plurality of straps; and
   forwarding the POC value to a plurality of processors over a plurality of pTp links, wherein the plurality of point to point links each comprise a pair of uni-directional links between pairs of processing cores; and
   setting operational parameters of the plurality of processors based on the POC value.

4. The method of claim 3, wherein the POC value is either one of the following:
   Platform Input Clock to Core Clock Ratio, Enable/disable LT, Configurable Restart, Burn In Initialization Mode, Disable Hyper Threading, System BSP Socket Indication, and Platform Topology Index.

5. The method of claim 3, wherein the pTp architecture adheres to a layered protocol scheme.

6. A method for establishing Power on Clear (POC) value in a point-to-point (pTp) architecture comprising:
   an Input Output (IO) agent to obtain the POC value from either a local non volatile memory (NVM) or from a firmware space and to forward the POC value to a plurality of processors; and
   the plurality of processing cores coupled with the I/O agent via the plurality of point to point links, the plurality of processing cores to receive the POC value and to set operational parameters based on the POC value.

7. The method of claim 6, wherein the POC value is either one of the following:
   Platform Input Clock to Core Clock Ratio, Enable/disable LT, Configurable Restart, Burn In Initialization Mode, Disable Hyper Threading, System BSP Socket Indication, and Platform Topology Index.

8. The method of claim 6, wherein the pTp architecture adheres to a layered protocol scheme.

* * * * *